United States Patent [19]

Wilson et al.

[11] Patent Number: 4,855,997

[45] Date of Patent: Aug. 8, 1989

[54] PRIORITY QUEUING TECHNIQUE FOR CONTENT INDUCED TRANSACTION OVERLAP (CITO) COMMUNICATION SYSTEM

[75] Inventors: Colleen R. Wilson, Cary, N.C.; Richard A. Burne, Columbia; Semyon Berkovich, Rockville, both of Md.

[73] Assignee: Allied-Signal, Inc., Morristown, N.J.

[21] Appl. No.: 135,902

[22] Filed: Dec. 21, 1987

[51] Int. Cl.[4] .............................................. H04J 3/00
[52] U.S. Cl. .................................... 370/85; 340/825.5
[58] Field of Search ........................ 370/85, 89, 90, 94, 370/95, 96, 118, 119; 340/825.5, 825.51

[56] References Cited

U.S. PATENT DOCUMENTS

| 4,199,661 | 4/1980 | White et al. | 370/91 |
| 4,199,662 | 4/1980 | Lowe, Jr. | 370/85 |
| 4,225,919 | 9/1980 | Kyu et al. | 370/85 |
| 4,434,421 | 2/1984 | Baker et al. | 370/85 |
| 4,493,074 | 1/1985 | Walter et al. | 370/119 |
| 4,598,411 | 7/1986 | Berkovich et al. | 370/118 |
| 4,642,630 | 2/1987 | Beckner et al. | 340/825.5 |

*Primary Examiner*—Douglas W. Olms
*Assistant Examiner*—Min Jung
*Attorney, Agent, or Firm*—Howard G. Massung

[57] ABSTRACT

A content induced transaction overlap communication (CITO) system for transmitting data over a single communication channel permits priority queuing for Senders having critical values. In one configuration, those Senders sensing the critical values transmit a word indicating the critical condition, and polling is limited to a group of sensors which include the sensor subject to the critical value.

16 Claims, 7 Drawing Sheets

PRIORITY QUEUING TECHNIQUE FOR CONTENT INDUCED TRANSACTION OVERLAP (CITO) COMMUNICATION SYSTEM

BACKGROUND OF THE INVENTION

The invention is related to multi-access channel communication systems referred to as a content induced transaction overlap multiple access (CITO) communication system.

PRIOR ART

Various types of multiple-access channel communication systems are known in the art. These communication systems may conveniently be divided into two distant types, the Time Division Multiple Access (TDMA) systems, and the Carrier Sensed Multiple Access (CSMA) systems. In Time Division Multiple Access systems, such as disclosed by Hopkins, et al. in U.S. Pat. No. 4,161,786, Lowe, Jr. in U.S. Pat. No. 4,199,662 or White, et al. in U.S. Pat. No. 4,199,661, the transmission channel capacity is divided into time slots during which identified transmitters are allowed to transmit their information over the communication network. Each transmitter is assigned a specific time slot so that each transmitter in turn will have an opportunity to transmit its information. In Carrier Sensed Multiple Access Systems, such as disclosed by Eswaran, et al. in U.S. Pat. No. 4,292,623, Herzog in U.S. Pat. No. 4,199,663, or Spracklen, et al. in U.S. Pat No. 4,337,465, each transmitter detects when the communication channel is idle, then after a predetermined period of time attempts to transmit its information. Typically, the waiting period depends on of the assigned priority of the transmitter. The priority of each transmitter may be fixed, but preferably as disclosed Burke, et al. in U.S. Pat. No. 4,232,294 the priorites of the individual transmitters are rotated so that each transmitter, at one time or the other, will have the highest transmission priority. If a collision occurs, i.e. when two different transmitters attempt to transmit simultaneously, the transmitters terminate their transmission and then attempt to transmit on the channel after waiting their respective delay times. If the transmission is successfully initiated, the transmitter sends the information until completion of the message. Hopkins, et al. (supra) disclose an alternate dual mode communication system incorporating both the Time Division Multiple Access and Carrier Sensed Multiple Access systems.

T. N. Zakharoya, V. S. Podlazov and G. G. Stetsyura, in their article "Fast Algorithm for Decentralized Priority Access to a Common Channel", Automation and Remote Control, vol. 41, No. 10, Part 2, pp. 1463–69, October 1980, disclose a novel algorithm for resolving channel access contentions. In the disclosed algorithm, each transmitter is assigned a priority code, and all the transmitters having information ready to send when the channel becomes idle, defined as a synchropause, constitute a generation. The priority codes are then sent out on the communication channel. The transmitters of each generation are then sorted out by priority and they are allowed access to the channel in the order of decreasing priorities. Using this method, each transmitter of a generation is permitted access to the channel before the generation of the next synchropause and the next generation. This method eliminates simultaneous transmission within each generation and assures that each transmitter within the generation will have an opportunity to transmit its information independent of its priority.

The problem with the Time Division Multiple Access system is that often a particular transmitter may not have any information to transmit during its allotted time slot, while other transmitters may generate two or more messages in the period between their allotted time slots. Therefore some transmission time slots are wasted while other messages are delayed while awaiting access to the common transmission line. This problem is partially overcome by the Carrier Sensed Multiple Access system under light or moderate loads. However under high message traffic conditions, the probability of simultaneous access to the common transmission line rises sharply, and excessive amounts of time are wasted resolving priority differences of the involved transmitters. The present content induced transaction over-lap communication systems is designed to overcome these problems.

U.S. Patent 4,493,074, to Walter, Wilson and Berkovich, and commonly assigned, discloses a content induced transaction overlap communication (CITO). The CITO transmission data from a plurality of senders to a receiver over a single communication channel. Each sender has a date register storing the multiple bit data word to be transmitted, a word boundary resister storing the number of bits in the data word and a bit position register. The transmission begins with each sender transmitting the highest order bit stored in the data register. Bits are transmitted on the channel in an overlapped manner such that the channel state is the logical sum or product of the transmitted bits. Using single phase representation, where a zero bit is transmitted as a fimite signal level and a one bit is transmitted as a null signal level, the composite channel states are accordingly 0 or 1.

Data transmission resumes at the termination of the bit competition. Each Sender, whether sending or not, listens to the communications channel's activity and decrements its word boundary register as each bit is transmitted. When the Word Boundary Register 38 reaches a zero value, the next word boundary has occured and "bit competition" is repeated.

This interleaving of data transmission and bit competition continues until all Senders have successfully completed transmission of their data words. At this point, all the Bit Position Registers 34 are zeros and no Sender performs in the bit competition. The m Senders recognize the termination of the current "data bucket" by the log (r) +1 bits of "silence" and the transmission of the next "data bucket" can begin after an optional synchronization pattern.

Synchronization with the communication channel implies that the Sender is able to distinguish word boundaries and bit competitions. Once the Sender is synchronized in this manner, it may enter into data transmission on the communication channel. If the Senders are to be permitted to dynamically attach and detach themselves, it is necessary that they be able to synchronize themselves when they come on line. As no special synchronization symbol is used, synchronization can only take place by recognition of a unique data pattern, a data pattern which cannot occur during the transmission of a bucket. This unique pattern might be a series of log (r) +1 +r bits of "1" appearing on the communication channel at the end of a data bucket. A Sender wishing to achieve synchronization uses this as a cue.

in order to give devices having critical information a priority status, the critical value is first recognized as critical by the Sender or by the receiver. This can be accomplished by the mechanism of interrupt of CITO transmission. The mechanism of interrupt of the CITO transmission works in the following way. A device which wants to interrupt the currently running bucket waits until the first available bit-competition and then enters this bit competition with the smallest value, say 00 . . . 00. This device obviously wins this bit competition, while other devices participating with their regular values lose this bit-competition and have to suspend.

A device which has won the bit competition is thus able to deliver an emergency message, so that the receiver may take the appropriate actions. In order to focus system's attention on critical issues the receiver can assign or reassign the priority tags for different groups of Senders which they have to use as a prefix to their messages. A group of Senders with a given prioority prefix will get access to the channel in accordance with the chosen preferences in focusing attention of the system. When the situation is changed, the priority tags can be reassigned.

It should be noted that using priority tags does not waste the channel capacity because due to overlapped fashion of CITO communications the prefix has to be sent only once at the beginning of the transmission of a certain group; the subsequent messages will be attached to the common parts of the previous ones. In any event, a critical value is indicated by a signal transmitted by the Sender.

When a critical value signal is sensed, the processor selects the group which includes the sender of the critical value and polls only that group. While this polling includes non-critical value Sender, the critical value Sender is also included in the polling, thereby assuring rapid information processing of the critical value Sender.

Once the critical value has been recognized and polled by the Receiver, it is necessary that the Receiver not be locked into signals from that group. Therefore, the polling of the critical value ignores the critical value for a short time. After critical values from a certain group of senders wich a given priority are received, then another group of senders with the next priority gets right for transmission; this occurs automatically by virtue of lexicographical ordering of the CITO protocol. This process can be controlled through mechanism of interrupt which can be followed by reassigning priorities or by polling.

The senders each then compare the state of the communication channel with their transmitted bit to determine if they are the same. If the state of communication channel is the same as the transmitted bit, the sender transmits its next highest bit and decrements its word boundary and bit position registers. However, if the state of the communication channel is different from its transmitted bit, the sender terminates the transmission of its remaining bits but continues to monitor the communication channel and decrement its word boundary register for each bit transmitted on the communication channel. At the end of the transmission of the data word, indicated by the word boundary register being decremented to zero, each sender enters into bit competition with all of the senders based on the content of its bit position register when it stopped transmitting to determine if it has lexico-graphically the next smallest data word. If it has, it initiates the sending of its remaining data bits. However, if it doesn't have lexicographically the next smallest data word, the sender waits until the end of the transmission of the current data word and re-enters the bit competition. This cycle repeats until all of the senders have completed the transmission of all the bits in their data words.

while the CITO system has advantages in increased throughput and its ability to handle information overloads, it is desired to focus a computer's attention on critical information from signal inputs.

SUMMARY OF THE INVENTION

The technique described in this disclosure is designed to allow the focusing of a computer's attention on critical information from a peripheral input, such as a sensor input. Application of this technique would allow a computer system to process critical information preferentially and thus raises the effective bandwidth of the machine by eliminating the process of noncritical information. This accomplished by using predetermined parameters to qualify inputs as having high priority status. Once the high priority input is recognized, it is only necessary to establish a general segregation of inputs so that the high priority input remains after segregation. This may be accomplished in several ways:

The signal reported value, as it represents an extremal, can be used by the processor as the critical value in the input universe, i.e. its focus.

The input devices can use the critical value (heard on the channel) as a key. All input devices with values within a given delta of the critical value proceed to send their data immediately following in a standard CITO transmission bucket.

The critical value may contain a geographic tag field. The host can use this to compute the ID of a neighborhood of input devices, broadcast back the neighborhood ID, and recieve data from all the input devices in the chosen neighborhood.

The processor can use the extremal value it has received to calculate a delta value, broadcast this value on the channel, and receive data back from all input devices within this delta of the extremal already sent (this implies a certain degree of intelligence at the input device end).

Any of the above techniques allow a processor to 'concentrate' its cycles on the data of greatest interest. A major advantage of this technique over traditional approaches is that the number of input devices can be as large as desired, but only a single data word transmission period is needed to identify the extremal. Traditional approaches would require that the processor acquire and search data from all the input devices in the network to identify the extremal. This is a bandwidth-limited technique and ultimately limits the number of input devices which can be utilized.

DETAILED DESCRIPTION OF THE INVENTION

Figure 1:
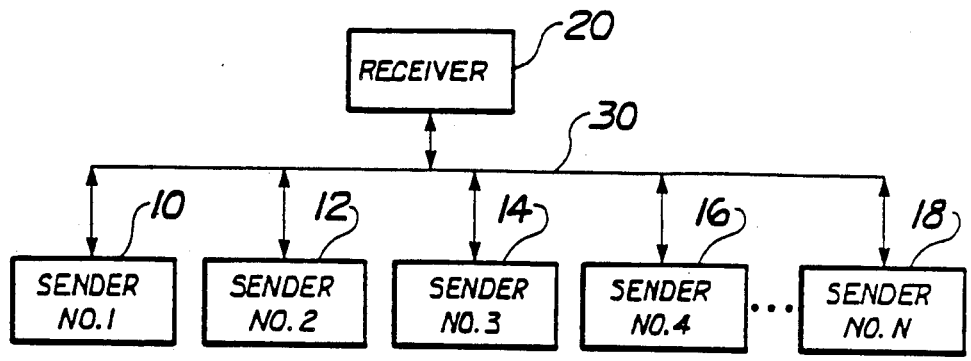
FIG. 1 is a block diagram of a multiple access communications system.

The content induced transaction overlap communication system is intended to solve many of the problems that exist when many transmitters require multiple access to a single communication channel to a common receiver. FIG. 1 is a block diagram of a typical system having multiple Senders 10 through 18 transmitting information to a Receiver 20 over a common communication channel or Bus 30. Each Sender 10 through 18 is capable of randomly sending information which is required by the Receiver 20. The Senders 10 through 18 may represent individual sensors, controls, or other types of inputs, or may be individual microprocessors in a multiple computer system or individual computers in a fault tolerant computer network or any combination of the above. The Receiver may be a utilization device, or master in a multiple computer system, or any other similar device.

Figure 2:
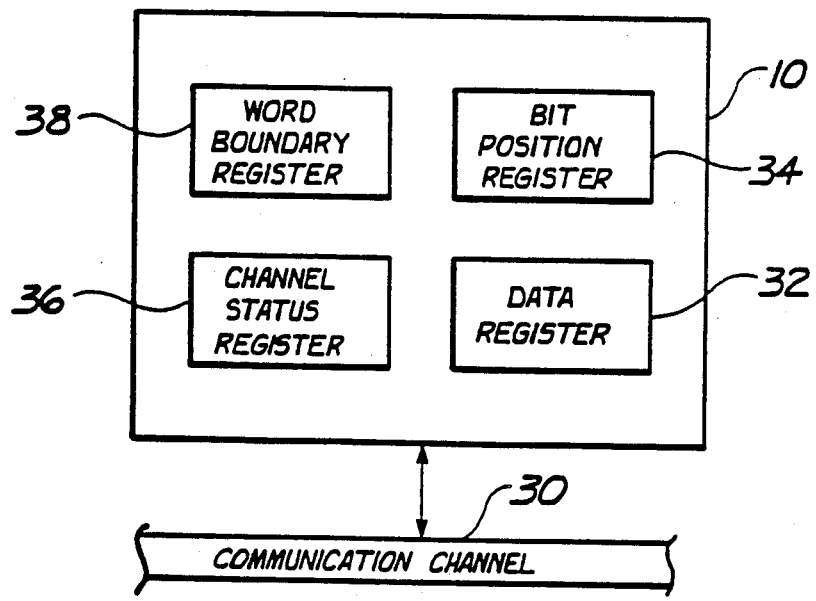
FIG. 2 is a block diagram illustrating the elements of the Sender in a content induced transaction overlap communications system.

Each sender 10 through 18 embodies a Data Register (DR) 32, Bit Position (BP) Register 34 a Channel Status (CS) Register 36 and a Word Boundary (WB) Register 38 as shown in FIG. 2. The Data Register 32 holds the data word to be transmitted to the communication channel 30. The data word is shifted out of the Data Register 32 to the communication channel 30 one bit at a time in serial fashion. The Bit Position Register 34 is loaded with the number of bits (r) in the data word to be sent after the Sender has synchronized with the channel. It is decremented every time the Sender sucessfully transmits a data bit. It is also used to determine access privilege to the communication channel. The Channel Status (CS) Register 36 is a one bit register storing the bit value of the last transmission on the communication channel and functions as the receiver portion of the Sender. The Word Boundry (WB) Register 38 keeps track of the number of bits that have been sent over the communication channel and is used to determine when a word has been completely transmitted. Until the word is completely transmitted, the Word Boundary Register 38 signals the Sender to attempt to continue its data transmission.

Figures 3, 4, 5, 6:
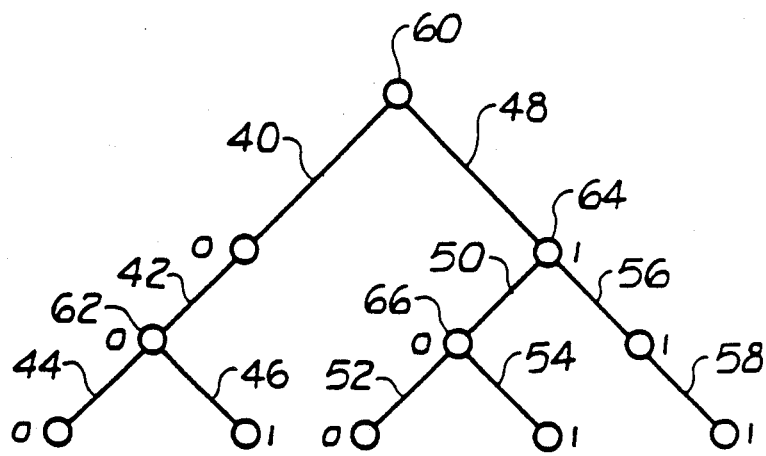
FIg. 3 is an example of a collection of 3-bit (words) tags.
FIG. 4 is a binary tree representation of the collection of 3-bit (words) tags shown in FIg. 3.
FIG. 5 is a graphical illustration of the 0 bit and 1 bit signals transmit on the communications channel.
FIG. 6 is an example of a message transmitted during content induced transaction overlap communication.
Figure 7:
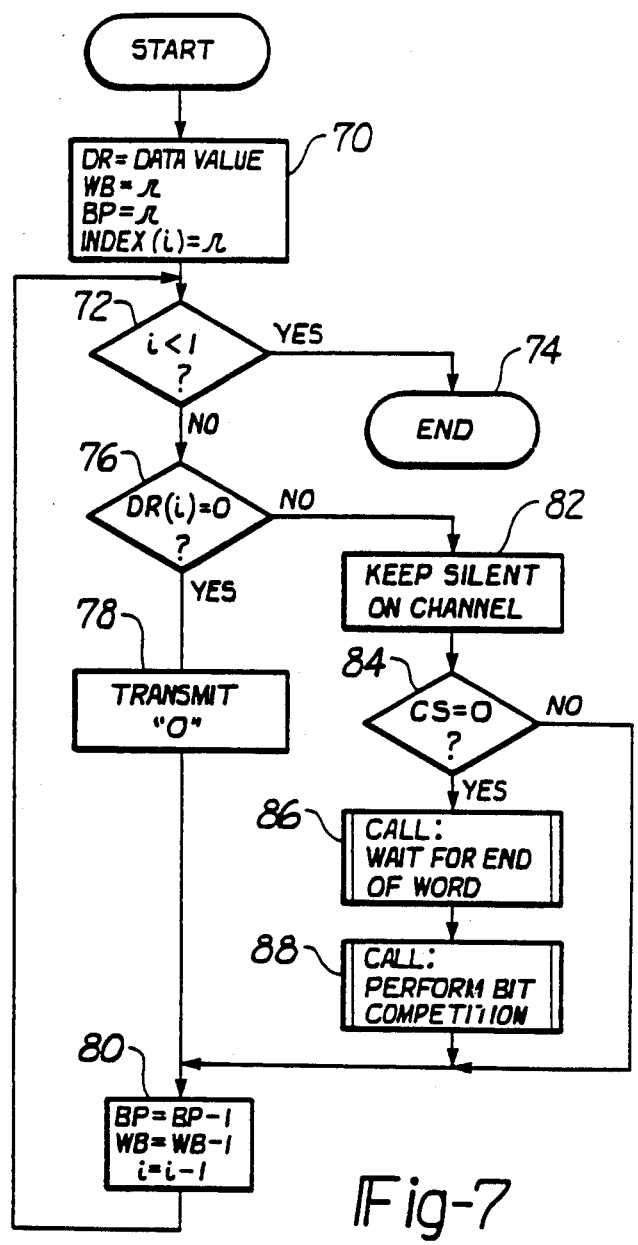
FIG. 7 is a flow diagram for the opewration of the Sender.
Figure 8:
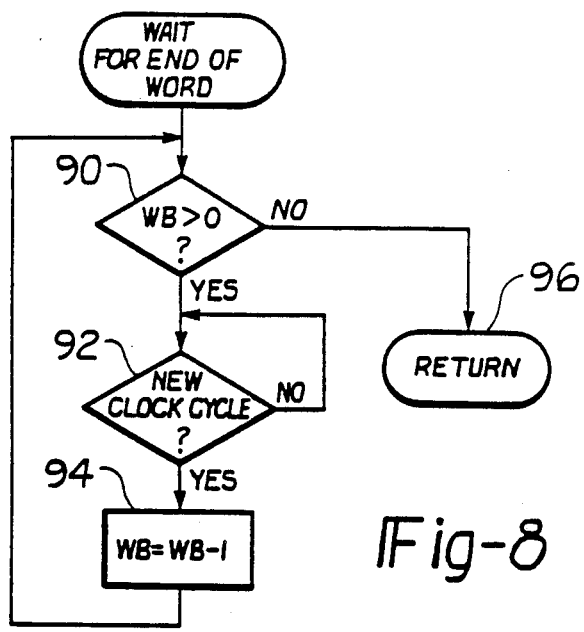
FIG. 8 is a flow diagram for the subroutine "Wait for the end of Word".
Figure 10:
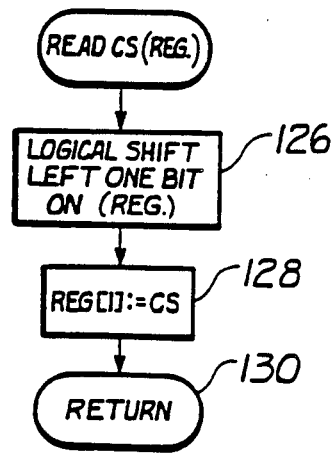
FIG. 10 is a flow diagram for the subroutine "Read Channel Status into Word Boundary Register".
Figure 9:
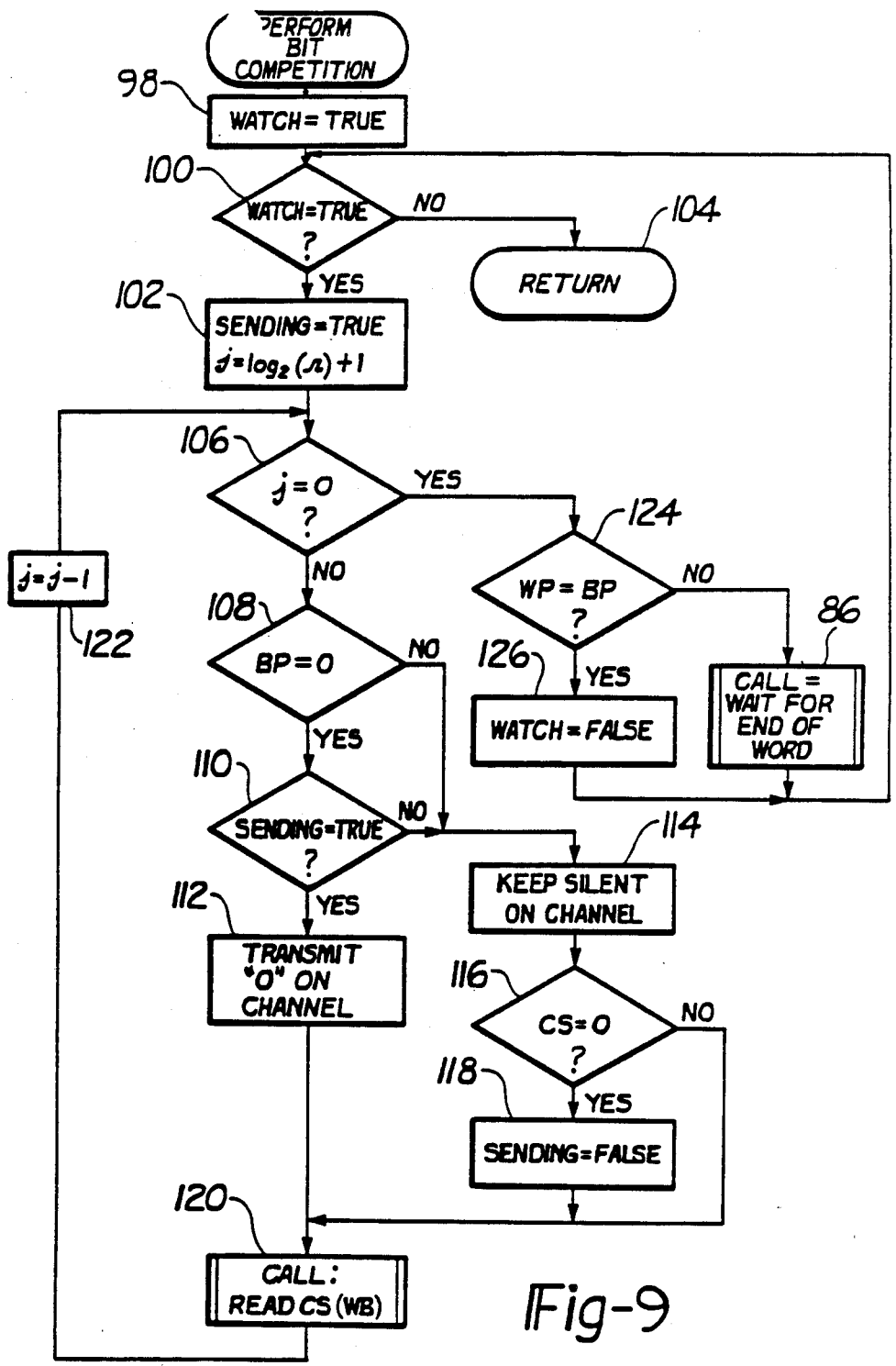
FIG. 9 is a flow diagram for the subroutine "Performs Bit Competition".
Figure 11:
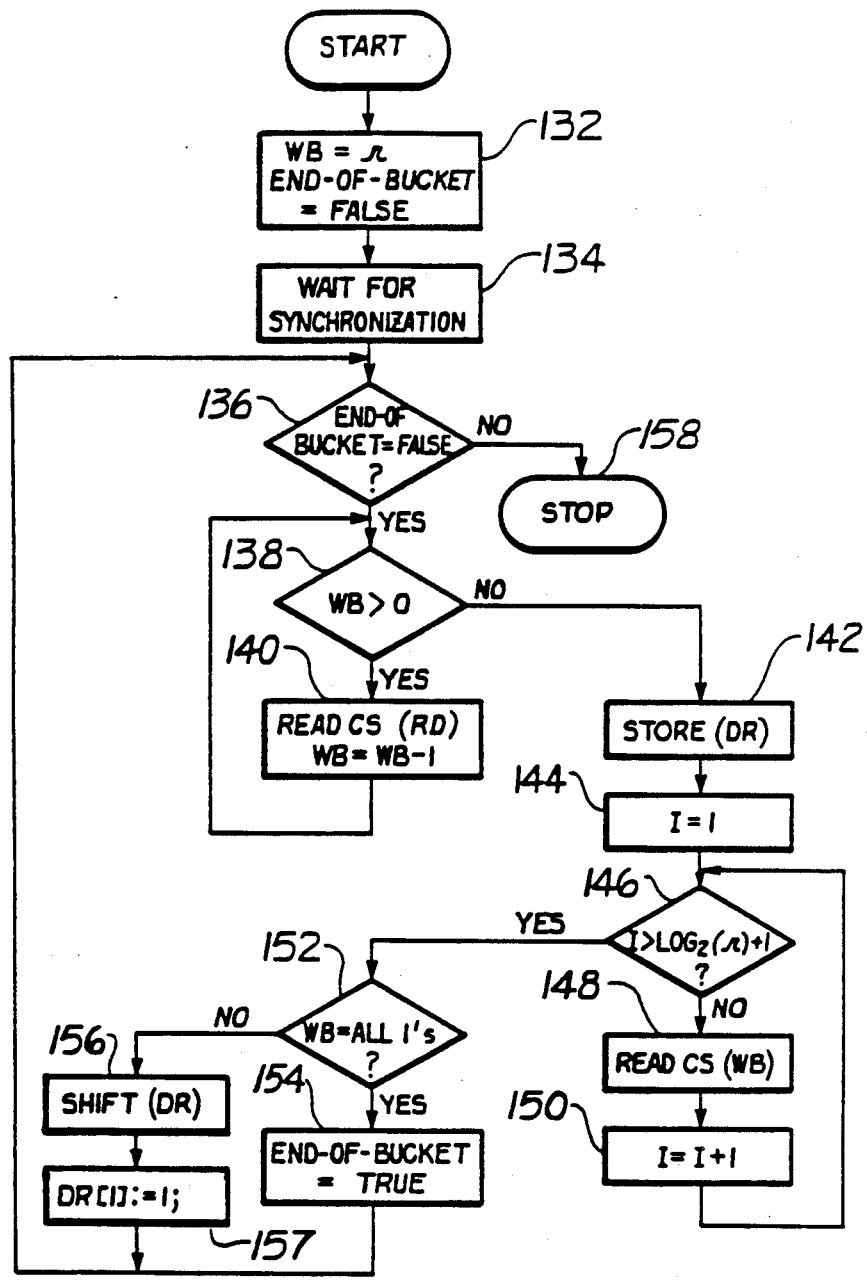
FIG. 11 is a flow diagram for the operation of the Receiver.

The content induced transaction overlap communication system is based on multiple match resolution methods developed for associative (content-addressable) memory technolgy. The problem of multiple match resolution is the selection of items from an associative memory, when more than one item corresponds to the input search criteria. The solution to this problem was given in early studies of associative processing by G. G. Stetsyura, "A New Principle for Organization of Computer Memories"— Doklady Akademiya Nauk USSR, Vol. 132, No. 6, pp. 1291-1294 and by M. H. Lewin, "Retrieval of Ordered Lists from a Content — Addressed Memory" RCA Review, pp. 215-229, June 1962. Assume that the sense lines for each bit pass through all words of memory and the sensed bit can be in one of four possible states. Using bi-phase codes, these line states may be represented by:

"0"–01 all words selected have 0's in this bit position
"1"–10 all words selected have 1's in this bit position
"X"–11 some words have 0's and some words have 1's in this bit position and
"Z"–00 no words selected FIG. 3 is an example of words in an associative memory with three bit tags. The multiple match algorithm uses the content of these tags to extract the individual words by scanning the three bit portions in succession. Each time "X" is sensed, a subset of matched words, i.e. words having "0" in this position, can be isolated. The algorithm is independent of the memory size and requires only $2m - 1$ read cycles to retrive m words.

By analogy, in data communications, each Sender can be trated as a word in an associative memory; successive sensings of the bit positions will be serial transmissions. Subsets of Senders can be isolated, in a like manner, through testing the transmission results. Such a multiple access organization called "Decentralized Priority Access" was suggested and developed by G. A. Kotyuzhanski, L. B. Nisnevich and G. G. Stetsyura, "Decentralized Priority Control in a Single Channel Data Transmission System" Teknicheskaya Kibernetika No. 2, 1971, by L. B. Nisnevich and G. G. Stetayura. Decentralized Priority Control in Intergal Communication Systems, Automation and Remote Control", Vol. 33, No. 4, pp. 795-798, 1972 and by T. N. Zakharova, V. S. Podlazov and G. G. Stetsyura, "Fast Algorithm for Decentralized Priority Access to a Common Channel", Automation and Remote Control, Vol. 41, No. 10, part 2, pp 1463-1469, October 1980. In these works, this algorithm was used for decentralized control to resolve contention for channel access among Senders of various priorities.

The content induced transaction overlap communication system uses this algorithm in a different way. Instead of resolving channel access priority, the algorithm is applied to the acquisition of data. In the content induced transaction overlap communication system, the collection of data words is transmitted concurrently. The information content of the individual data words is then resolved gradually from the overlapping transactions in the course of the transmission. The transmission is in fact a decentralized preorder traversal of the binary tree representing the data word collection.

This technique achieves desirable improvements in a muiltiple-access channel communication system in several areas, it improves average throughout and stability while decreasing delays. Additionally this technique has other properties which provide greater flexibility to transmission control. Some of the features of the content induced transaction overlap communication system are dynamic to varying numbers of users, immediate priority for emergency messages, content based data selection, elimination of transmission of duplicate information, no channel lock-up in burst mode, and fast recovery from overload.

To illustrate the inherent redundancy of sequenced data, suppose we have a collection of m r-bit words. This collection requires m times r bits for its sequenced representation. The cardinality of all possible r-bit messages is $2^{mr}$. The same collection of words, in any permutted order, has equal information value for a Receiver uninterested in the time sequence of the data's arrival. This implies that the useful variety of messages is m! times smaller. Therefore the information content (I) of such a collection of words is:

$$1 = \log 2^{mr}/m! \tag{1}$$

where the logarithm here and elsewhere in this discussion are base two.

Since we are dealing with collections of distinguishable words, m cannot be greater than $2^r$. Using Stirling's approximation $m! = \sqrt{2\pi m}(m/e)^m$ for large values of m. We obtain:

$$1 = mr - m \log m = mr[1 - (\log m)/r] \tag{2}$$

Referring to the example shown in FIG. 3, the five three-bits tags may also represent 5 three bit words. Fifteen bits are required to represent these 5 three bit words in some sequence. Any such sequence representation contains redundancy since 5! = 120 different orderings of these words.

To estimate the redundancy of the sequenced data words, consider their binary tree representation illustrated in FIG. 4. The branches of the tree are labeled with 0's and 1's so that the set of paths from the root to the terminal nodes represents the word collection. If order is not considered we will see that the set of branches in the tree's preorder traversal, with a relatively small amount of additional information, can be used to obtain the entire collection of words. In the example of FIG. 4, the tree contains 10 branches, branches 40 through 58 which means that the information content of our collection is approximately 10 bits rather than 15.

The preorder traversal in itself is insufficient, in general, to reconstruct the binary tree representing the collection of words. To make the preorder traversal uniquely decodable, some additional information about the boundaries between the words must be added. The bifurcation points 60 through 64 of the binary tree, for example, may be indicated using the overlapping X state for conjointed branches with 0's and 1's of the preorder traversal. This corresponds to the usuage of the "X" state in the above-mentioned algorithm of ordered retrieval from associative memory. Therefore, the "0"'s and "1"'s representing branches in the preorder transversal are mapped into the overlapped symbols "0", "1" and "X".

The symbol "X" is the result of superposition of "0" and "1" when a node with two incident branches is passed. Nodes with only one incident branch simply correspond to "0" or "1" in this symbol set. It is easy to verify that such an overlapped transation, when the word length is fixed, is uniquely decodable. Note that the number of symbols in the overlapped transaction (Q) is less than the number of branches in the binary tree.

The number of "X"'s (bifurcation points) in the transaction is equal to m−1, where m is the total number of words. This represents a general relationship between the number of nodes with two branches, i.e. the number of "X"'s, and the number of terminal nodes for an arbitrary binary tree. Thus, the number of branches in the binary tree is Q+(M−1). The number of read cycles required to extract m words from the associative memory is the sum of the number of "X"'s and the number of words, i.e. $(2_{m-1})$.

The information content (I) of the collection of m r-bit words is greater than the number of bits in the preorder traversal (Q+M−1). On the other hand, it is less than the total information which can be represented by Q ternary symbols, i.e. Q log 3. Therefore:

$$Q + (m-1) < I < Q \log 3 \tag{3}$$

The results of simulations performed on random word collections with different r and m parameters have indicated that "Q" is close to the approximation of "I" as given by equation (2). Hereinafter it will be shown that in the content induced transaction overlap communication system, the number of bits "A" required to transmit an m collection of r-bit words is equal to Q binary digits with an overhead of log r bits per word as given by:

$$A = Q + m \log r = mr[1 - \log m/r]/r \tag{4}$$

The factor [1−(log m/r)/r] in equation (4) is less than one when m>r. When this occurs, the content induced transaction overlap communication system provides data compression because the eliminated redundancy offsets the transmission overhead. For example, if we have 64 words of 16 bits each, the overhead factor will be [1−(log 64/16)/16]=0.88. Therefore, for this specific example, data can be transmitted with 12% fewer bits than the product of m r.

The fundamental operation of the content induced transaction overlap communication system is the overlapped sending of the individual data bits following the analogy with multi-match resolution in associative memory discussed above. Three states exist in the content induced transaction overlap communication system during bit transmission. These are:

"0" all Senders are transmitting zero-bits
"1" all Senders are transmitting one-bits
"X" some Senders are transmitting zero-bits and some are transmitting one bits The Receiver does not actually need to distinguish these three states. It can identify "X" with "0" so that if X is received, it is interpreted as "0". Senders can also distinguish "X"'s and "0"'s. This is due to the fact that the Sender knows what it has just transmitted and can recognize its own possible discord with the current channel state. Therefore, the transmission process can be organized using only two-state coding, i.e., "0"'s and "1"'s.

This is implemented by representing a Sender's information as a certain impulse for the transmission of a zero-bit ("0") and a null level signal for the transmission of a one bit ("1") as illustrated in FIG. 5. This representation results in the channel state "0" or "X" appearing as a finite level signal and a channel state "1" appearing as a null. The number of Senders in this implementation is inconsequential, but the number of distinguishable messages is limited $2^m$.

When the Sender has transmitted a finite level signal indicative of a zero bit, the communication channel will be in the "0" or "X" state. This Sender can continue transmission. If a Sender has transmitted a null level signal indicative of a one-bit, it must first determine the state of the communication channel before continuing transmission. When the channel state is a one bit, a null signal level, then the transmitted one bit is picked up by the Receiver and the Sender can continue its activity. However, if the channel state is a "0" bit as indicated by a finite level signal, the Receiver does not receive the transmitted null signal and the Sender recognizes the transmitted one-bit is different from the communication channel state. The Sender then knows that in fact the communication channel state is an "X" state with at least one other Sender transmitting a zero-bit. The Sender retains its current bit position and delays further transmissions. This coding organizes the transmission so that the lexicographically smallest words in the transmitting collection are the first received by the Receiver.

The channel states 0, X and 1 carry information. A separator symbol, such a "Z" in a bi-phase implementation is avoided in the single phase implementation of the content induced transaction overlap coommunication system. Therefore special protocols must be introduced to identify the word collection boundaries.

Consider a content induced transaction overlap channel with n attached Senders. An arbitrary number "m" of the attached Senders have data ready and have multi-access to the communication channel. Each Sender is capable of transmitting a single r-bit word. The collection of the r-bit words in the m different senders is called a "data bucket". Other Senders on the communcations channel may become ready to transmit during an active "data bucket", however, these Senders must wait until the current data bucket is completely transmitted. The data of the waiting Senders will then become part of the next sequential "data bucket".

FIG. 6 depicts the format of the message transmitted to the Receiver 20, using the example data shown in FIG. 3. The message comprises two types of information, bit position and data. The bit position information is used by the Receiver to reconstruct the word upon receipt.

Consider the transmission of a single data bucket. As the data bucket becomes active each Sender's Word Boundary Register 38 and Bit Position Register 34 (FIG. 2) is loaded with the value "r" indicative of the number of bits in the word to be transmitted. The transmission over the communication channel 30 begins with each of the m Senders simultaneously transmitting their higher order data bit. Those transmitting a "0"-bit, raise the signal level on the communication channel 30 by a finite value. Those transmitting a 1-bit leave the signal value on the communication channel unchanged. Each sender listens to the communication channel during this transmission. If the Sender just transmitted a 0 or 1 and senses that the state of the channel is not the same as its transmitted bit, it will decrement only its Word Boundary Register 38 and does not transmit its next bit. This Sender however continues to listen to the communication channel and decrements it's Word Boundary Register 38 with each bit transmitted by the other Senders.

This procedure is repeated, with Senders dropping out of the transmission as described above, until the first r-bit word is fully transmitted. This word will be lexicographically the smallest. The remaining m−1 Senders will recognize the occurrence of a word boundary by their Word Boundary Registers 38 being decremented to zero. Each of the remaining m−1 Senders begins transmitting again, but it does not transmit a data bit. The Senders instead transmit the high order bit of their respective Bit Position Register 34. This transmission occurs exactly as described above for data. However, as each Sender listens to the current channel, it shifts this bit value into the Word Boundary Register 38. This bit position transmission continues until all the bits of the Bit Position Register 34 have been transmitted. It is obvious that at the end of this activity, called "bit competition" the value which has been shifted into the Word Boundary Register is lexicographically the smallest value present in any of the Bit Position Registers of the reamaining Senders. The Senders still needing to transmit data now compare their Bit Position and Word Boundary Registers. If the two are equal, the Sender immediately begins to transmit the next bit in its data register.

The Senders which win the bit competition are the Senders which have the fewest bits in their data words remaining to be transmitted. There may be only one Sender winning the bit competition but in case of reducdancy in the word to be transmitted, it is possible more than one sender can win the bit competition. In terms of the preorder tree transversal, FIG. 4, the bit competition winner is the Sender or Senders which ceased transmission at the last bifurcation point on the tree. The data transmission resumes with the traversal down this branch. The Sender which won the bit competition does not resend the "1" it was sending when it terminated transmission. This is due to the fact that the Receiver 20 already knows the value of this bit. In particular, if the Sender or Senders which win the bit competition have only one more bit to send it does not send this bit since its value must be "1".

The ability to "flag" critical values can be combined with an ability to ignore these critical value flags subsequent to recognition in order to prevent the system from excluding non-critical information. Thus, critical values would be given a priority but the critical readouts would be followed by non-critical readouts.

By flaging actual values as being actually greater than or equal to non-critical values, the tendency of CITO to favor smaller values becomes less of a problem.

Critical values can be flagged either as a single "critical value" bit or, preferably as a "critical value" group of bits. The "critical value" group of bits could be assigned to either individual Senders or to groups of Senders.

The use of bit recognition avoids the requirement of the use of separate signal lines or alarm lines. While such separate signal lines are feasible, the preferred techniques include the use of bit recognition of critical values of Senders.

The critical value may, of course, trigger polling of Senders which do not include the Sender transmitting the critical value, so long as the polling response is appropriate.

Figure 12:
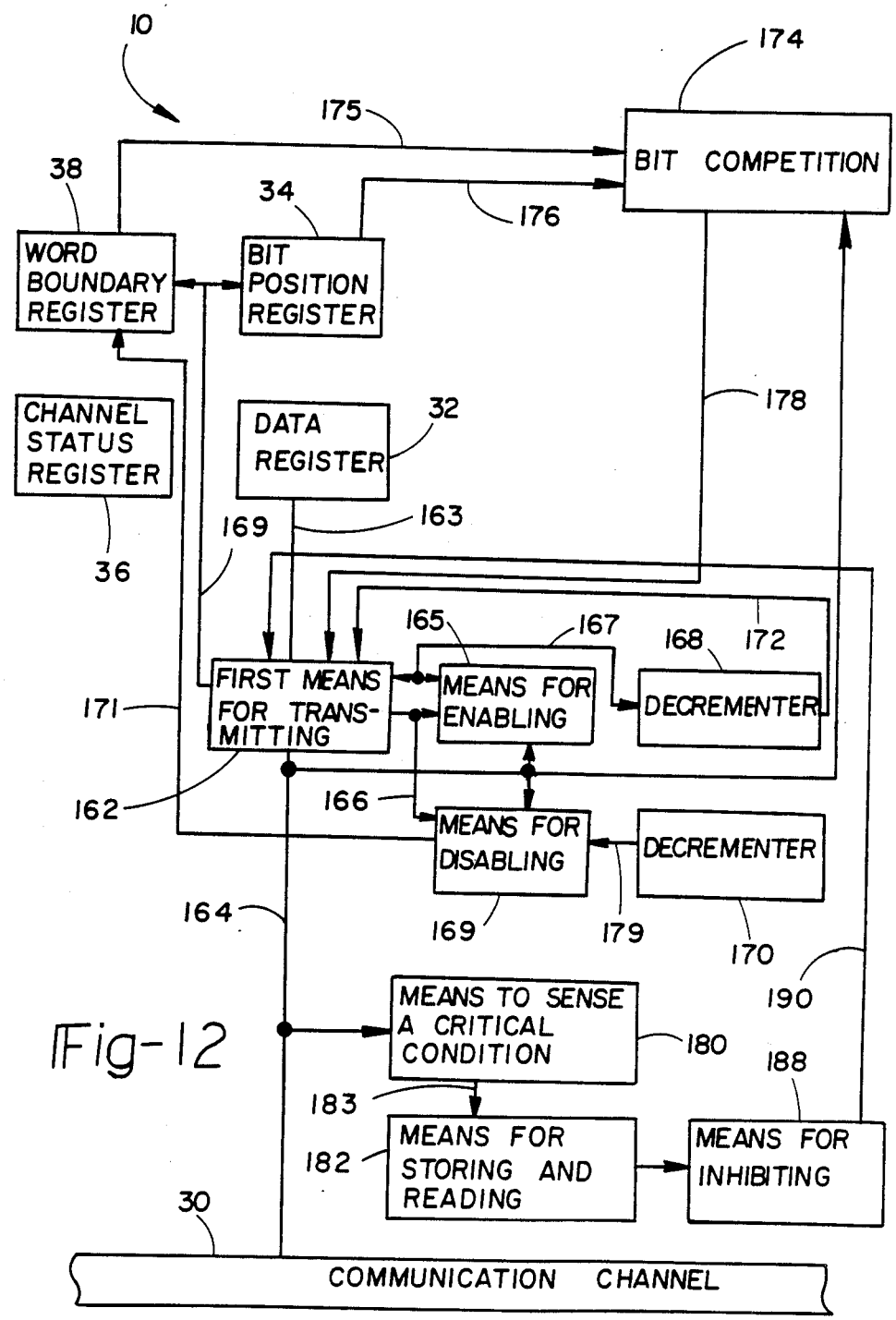
FIG. 12 is a block diagram illustrating one embodiment of the invention.

The invention describes a data communication system having a single data communication channel (30) interconnecting a plurality of Senders (10, 12, 14, 16, 18) to at least one receiver (20), wherein each Sender as shown in FIG. 12 comprises a data register (32) for storing a multi-bit data word; each bit of said multi-bit data word having one of two possible states, a word boundary register (38) for storing a number corresponding to the number of bits in said multi-bit data word, a bit position register (34) for storing a number corresponding to the number of bits in said multi-bit data word that remain to be transmitted, a first means for transmitting (162) the data bits from said data register (32) over lead (163) to the communication channel (30) over lead (164) one bit at a time in serial fashion, a means for enabling (165) responsive at times the communication channel assumes the same state on lead (164) as the transmitted data bit on lead (166) for enabling via lead (167) said first means for transmitting (162) to transmit the next data bit, said first means for transmitting (162) further including means for decrementing (168) said word boundary register (38) and said bit position register over leads (169, 172) at said times to signify that the state of the transmitted data bit over lead (166) was the same as the state of the communication channel (30) on lead (164), a means for disabling (169) said first means for transmitting (162) in response to detecting a difference between the state of the transmitted bit over lead (166) and the state of the communication channel (30) over lead (164), said means for disabling (169) further including means (170) for only decrementing over leads (171, 179) said word boundary register (38) for each bit transmitted on the communication channel (30); bit competition means (174) responsive to the word boundary register (38) over lead (175) being decremented to zero for comparing the contents of its sender's bit position register (34) over lead (176) with the contents of the bit position registers in the said other plurality of Senders over lead (164) at times the contents are transmitted over the communication channel (30) by CITO Protocol to enable over lead (178) said first means for transmitting (162) at times the content of its bit position register (34) is indicative of the lexicographically smallest data word remaining to be transmitted; means (180) to sense over lead (164) a critical condition indicated by one of the Senders; means (182) responsive via lead (183) to the sensed critical condition for storing a data word indicative of the existence of the sensed condition; means for reading (182) the data word sent by said one of the senders over lead 164 indicative of the sensed critical condition provided over lead (183), said means (182) responsive to said sensed critical condition further including means for inhibiting (188) said first means for transmitting (162) via lead (190) until a Sender associated with the critical condition has transmitted its data bits.

We claim:

1. A method for transmitting data from a plurality of Senders to a receiver over a single communication channel characterized by the steps of:

storing in a data register in each of said Senders a multi-bit data word indicative of the data to be transmitted to the receiver, each bit having one of two possible states;

storing in a word boundary register in each Sender the number of bits in said data word;

storing in a bit position register in each Sender the number of bits in said data word;

providing an indication of criticality for at least one of the Senders;

storing in said data register a data word representative of the indication of criticality;

transmitting the highest order data bit in said data register to said communication channel;

detecting the state of the communication channel by each Sender to determine when the state of the communication channel is the same as the state of the transmitted data bit;

transmitting the next highest order data bit when the state of the channel is the same as the state of the transmitted data bit;

decrementing said word boundary register and bit position register for each transmitted data bit whose state was the same as the state of communication channel;

terminating the transmission of the remaining data bits by each Sender whose transmitted data bit is different from the state of the communication channel;

waiting by each Sender which has terminated the transmission of its remaining data bits until the transmission of the data word currently being transmitted is completed;

perform bit competition in response to the end of the transmitted data word to determine if the content of the bit position register of the waiting Senders is lexicographically indicative of the next smallest data word;

transmitting the remaining data bits to the communication channel by each waiting Sender when said bit competition affirms that the data word of a waiting Sender is indicative of the next lexicographically smallest data word;

repeating said steps of detecting the state of the channel, transmitting the next highest data bit, terminating transmission, waiting by each Sender, and performing bit competition until all of the Senders have completed the sending of its stored data word;

detecting the state of the communication channel by Senders associated with the indication of criticality on a priority basis prior to detecting the state of the communication channel by Senders not associated with the indication of criticality; and interrupting sufficiently the detection of the state of the communication channels by Senders associated with the indication of criticality to permit polling of Senders not associated with the indication of criticality.

2. The method of claim 1, wherein the data word representative of an indication of criticality provides a signal which is associated with a plurality of Senders.

3. The method of claim 2, wherein said two possible states of the data word's bits are 0's and 1's, said step of transmitting the highest order data bit includes transmitting said 0 bit as a finite value and said 1 bit as a null.

4. The method of claim 3, wherein said step of waiting comprises the steps of:

checking by each waiting Sender the content of its word boundary register at the end of each transmission on the communication channel to determine if the word boundary register has been decremented to zero;

decrementing its word boundary register for each transmitted data bit when the content of its word boundary register is not zero; and signifying transmission of a data word has been completed when the content of the word boundary register is zero, wherein said step of performing bit competition comprises the steps of:

setting to "true" a watch flag in each Sender whose transmission was terminated prior to sending all of its data bits;

setting to "true" a sending flag in each Sender whose transmission was terminated prior to sending all of its data bits;

testing the highest order bit in the bit position register to determine its state;

transmitting said highest order bit in the bit position register on the communication channel when said sending flag is "true" and said tested bit position bit has a first state;

testing the state of the channel in response to said tested bit position bit having a second state to determine if the channel is also in the second state;

setting said sending flag to "false" when said channel state is different from said tested bit position bit's state;

reading the state of the communication channel into the word boundary register;

indexing to the next lower order bit position bit in the bit position register and repeating the above steps until the bit position register is exhausted;

comparing the content of the word boundary register with the content of the bit position register to set said watch flag to "false" when the content of said bit position and word boundary registers are the same signifying that the word stored in its data register is lexicographically the next smallest word; and repeating said step of waiting by each Sender when the content of their respective word boundary and bit position registers are different, and;

wherein the collection of data words being transmitted by the plurality of Senders is called a data bucket, and wherein said step of bit competition transmits a predetermined bit pattern after transmitting the last data word in said data bucket, the operation of the receiver is characterized by the steps of:

storing in a receiver word boundary register a number indicative of data bits in each of the multi-bit data words;

setting and end-of-bucket flag to false;

recording each received data bit in a receiver data register;

decrementing said receiver word boundary register in response to each received data bit;

detecting when said word boundary register is empty to store the data bits recorded in the data register as a received data word;

recording the next sequentially received bits corresponding to bit position data into said word boundary register;

counting the received bit position data bits stored in said word boundary register to determine when said step of bit competition is completed;

testing the content of the word boundary register for a predetermined bit pattern to set the end-of-bucket flag to "true" signifying the data from all the Senders has been received in response to said predetermine bit pattern;

shifting the data in said data register by the number of bits identified by the bit position data currently stored in the receiver's word boundary register in response to content of the reciver's word boundary register not having said predetermined bit pattern;

shifting the data in the data register by one bit in the opposite direction and setting the low order bit to a logical 1;

repeating the above steps until said step of testing the content of the receiver's word boundary register detects said predetermined bit pattern; and terminating said procedure in response to said end-of-bucket flag being set to "true".

5. The method of claim 1, wherein a plurality of senders sense the indication of criticality, and upon sensing the indication of criticality, all of said plurality of Senders with values within a given delta value of the critical value proceed to send their data immediately following in a standard CITO transmission bucket.

6. The method of claim 1, wherein the receiver, upon receiving a extremal value transmits a delta value of said extremal value, whereupon a plurality of the Senders which have stored values within this delta value of said extremal value transmit their data bits.

7. A data communication system having a single data communication channel interconnecting a plurality of Senders to at least one receiver, wherein each Sender comprises:

data register means for storing a multi-bit data word; each bit of said multi-bit data word having one of two possible states;

word boundary register means for storing a number corresponding to the number of bits in said multi-bit data word;

bit position register means for storing a number corresponding to the number of bits in said multi-bit data word;

first means for transmitting the data bits from said data register to the communication channel one bit at a time in serial fashion;

means responsive at times the communication channel assumes the same state as the transmitted data bit for enabling said first means for transmitting to transmit the next data bit, said first means further including means for decrementing said word boundary register and said bit position register at said times to signify that the state of the transmitted data bit was the same as the state of the communication channel;

means for disabling said first means for transmitting in response to detecting a difference between the state of the transmitted bit and the state of the communication channel, said means for disabling further including means for only decrementing said work boundary register for each bit transmitted on the communication channel;

bit competition means responsive to the word boundary register being decremented to zero for comparing the contents of its Sender's bit position registers in said other plurality of Sender's at times the contents are transmitted over the communication channel by CITO protocol to enable said first means for transmitting at times the content of its bit position register is indicative of the lexicographically smallest data word remaining to be transmitted;

means to sense a critical condition indicated by one of the Senders;

means responsive to the sensed critical condition for storing a data word indicative of the existence of the sensed condition;

means for reading the data word indicative of the sensed critical condition, said means for reading further including means for inhibiting sais first means for transmitting until a Sender associated with the critical condition has transmitted its data bits.

8. The data communication system of claim 7 wherein said means for enabling comprises:

means for comparing the state of the data bit to be transmitted with a predetermined state to determine if the data bit to be transmitted is the same as said predetermined state; and means responsive to the state of the data bit to be transmitted and the state of the communication channel being different from said predetermined state to enable said first means for transmitting to transmit said next data bit.

9. The data communication system of claim 8 wherein daid two possible states are logical states 0 and 1, and wherein said predetermined state is a 0.

10. The data communication system of claim 9 wherein said first means for transmitting transmits said logical 0 state as a finite value and said logical 1 state as a null.

11. The data communication system of claim 10 wherein said bit competition means comprises:

means for setting a watch flag to "true" in response said means for transmitting being disabled;

means for setting a sending flag to "true" in response to detecting the word boundary register being decremented to zero;

second means for transmitting the content of said bit position register to said communication channel one bit at a time in serial fashion;

means responsive to the communication channel assuming the same state as the state of the transmitted bit position bit and said sending flag being "true" for enabling said second means for transmitting to transmit the bit position bit on the communication channel;

means for recording the state of the communication channel in said word boundary register for each transmitted bit;

means for setting said sending flag to "false", disabling said second means for transmitting in response to detecting a difference between the state of the transmitted bit position bit and the state of the communication channel;

comparator means responsive to the transmission of all of the bit position bits for comparing the content of the word boundary register with the content of the bit position register to set the watch flag to "false" when they are equal, the setting of said watch flag to "false" enabling said first means for transmitting the resume transmission of the data bits from the data register.

12. The data communication system of claim 7 wherein the collection of the data words being transmitted by said plurality of Senders is called a data bucket, and wherein said bit competition means transmits a predetermined bit pattern after the last data word in said data bucket is transmitted, said receiver comprises:

means for recording said data bits in response to the state of said communication channel; and means for reconstructing the data words transmitted by the senders in response to the state of said communication channel during said bit competition.

13. The data communication system of claim 12, wherein said means for recording comprises:

a receiver word boundary register for storing a number indicative of number of bits in said data words to be received;

a means for entering in a receiver data register the state of each bit transmitted on said communication channel;

means for decrementing said receiver word boundary register in response to entering each of said data bits in said receiver data register; and means for detecting when said receiver word boundary register is decremented to zero to indicate that the data bits entered into said receiver data register is a data word.

14. The data communication system of claim 13 wherein said means for reconstructing said data words comprises:

a counter for counting the number of bit position bits transmitted on the communication channel;

means for resetting said counter in response to said receiver word boundary register decremented to zero;

means for recording in said receiver word boundary register the state of said communication channel for each transmitted bit position bit;

means for incrementing said counter for each recorded bit position bit;

means for comparing the content of said receiver word boundary register with said predetermined bit pattern to detect the end of the transmission of all of the data words in the data bucket;

means for shifting the data in the receiver data register by a number of bits equal to the number stored in the receiver word boundary register in response to the content of the receiver word boundary register being different from said predetermined bit pattern;

means for shifting the data in the word boundary register back by one bit and setting the low order bit to a logical "1"; and means for signifying all the data words in the data bucket have been received in response to the content of the receiver word boundary register being the same as said predetermined code.

15. The communication system of claim 14 wherein said predetermined code is all 1's.

16. The communication system of claim 14 wherein said predetermined code is all 0's.

* * * * *